(12) United States Patent
Lee et al.

(10) Patent No.: US 12,549,618 B2
(45) Date of Patent: Feb. 10, 2026

(54) APPARATUS AND METHOD FOR ENCODING VIDEO WITH ULTRA-LOW LATENCY

(71) Applicant: QUOPIN CO., LTD., Seongnam-si (KR)

(72) Inventors: Sang Hoon Lee, Seongnam-si (KR); Hack Kyung Kim, Incheon (KR); Soo Hyun Park, Ansan-si (KR)

(73) Assignee: QUOPIN CO., LTD., Seongnam-si (KR)

( * ) Notice: Subject to any disclaimer, the term of this patent is extended or adjusted under 35 U.S.C. 154(b) by 184 days.

(21) Appl. No.: 18/519,110

(22) Filed: Nov. 27, 2023

(65) Prior Publication Data

US 2024/0098132 A1  Mar. 21, 2024

Related U.S. Application Data

(63) Continuation of application No. PCT/KR2022/006957, filed on May 16, 2022.

(30) Foreign Application Priority Data

May 28, 2021 (KR) .......................... 10-2021-0069294

(51) Int. Cl.
*H04L 65/80* (2022.01)
*H04L 65/65* (2022.01)
(Continued)

(52) U.S. Cl.
CPC .............. *H04L 65/80* (2013.01); *H04L 65/65* (2022.05); *H04L 65/752* (2022.05); *H04L 65/762* (2022.05)

(58) Field of Classification Search
CPC ....... H04L 65/80; H04L 65/65; H04L 65/752; H04L 65/762; H04N 21/24; H04N 21/2543; H04N 21/64
See application file for complete search history.

(56) References Cited

U.S. PATENT DOCUMENTS

2016/0381397 A1  12/2016 Krahnstoever et al.
2020/0206618 A1*  7/2020 Perlman ............... H04N 19/146

FOREIGN PATENT DOCUMENTS

KR  20120108942 A  10/2012
KR  20160140012 A  12/2016
(Continued)

*Primary Examiner* — Soe Hlaing
(74) *Attorney, Agent, or Firm* — NKL Law; Jae Youn Kim

(57) ABSTRACT

The present disclosure provides an apparatus and method for encoding a video with ultra-low latency, the apparatus including: one or a plurality of video sources configured to provide a video signal; an encoder configured to encode the video signal provided through the video source and provided for each of the video sources; and a caster configured to transmit video data encoded by the encoder to the outside through a network communication network.

Accordingly, the present disclosure can transmit a video with ultra-low latency, so a video service is possible in real time anytime anywhere as long as the internet is connected, whereby there is the advantage that the present disclosure can be applied to various fields of 4th industry such as autonomous driving, unmanned drone operation, driving of unmanned heavy equipment, robot control, a remote medical service, VR/AR, an intelligent CCTV, a smart city•factory, provision of traffic information, etc.

12 Claims, 8 Drawing Sheets

(51) Int. Cl.
*H04L 65/75* (2022.01)
*H04L 65/752* (2022.01)

(56) References Cited

FOREIGN PATENT DOCUMENTS

| KR | 101821145 | B1 | 1/2018 |
| KR | 20200112405 | A | 10/2020 |

* cited by examiner

APPARATUS AND METHOD FOR ENCODING VIDEO WITH ULTRA-LOW LATENCY

TECHNICAL FIELD

The present disclosure relates to an apparatus and method for encoding a video with ultra-low latency, the apparatus and method transmitting an end-to-end video in real time in a network. In more detail, the present disclosure relates to an apparatus and method for encoding a video with ultra-low latency, the apparatus and method being able to provide an ultra-low latency service anytime anywhere as long as the internet is connected, by enabling real-time video transmission through a 5G network.

BACKGROUND ART

With the full-fledged advent of the era of 5th generation (5G) mobile communication service that enables 4th industrial revolution, the 5G mobile communication is being applied to various fields including Virtual Reality (VR), Autonomous driving (AD), and Internet of Things (IoT). 5G that enables 4th industrial revolution is a mobile communication technology, which uses UHF of 28 GHz and shows a maximum download speed of up to 20 Gbs, has 'ultra-high speed', 'hyper-connectivity', and 'ultra-low latency' as principal characteristics.

'Hyper-connectivity' means that as the information technology makes a deep inroad into everyday life, all things are connected with human like a spider's web and 'ultra-low latency' means that the end-to-end video transmission time is a level of several tens of microseconds in machine type communication.

However, whether 'ultra-low latency' that is one of the principal characteristics of 5G mobile communication is implemented depends on development of a video encoding apparatus and method being able to maintain the end-to-end video transmission time of machine type communication almost at real time (RT).

However, video encoding apparatuses and methods of the related art are focused only on the technology for securing and maintaining high resolution, so there is a problem that a video encoding apparatus and method for transmitting an end-to-end video in an ultra-low latency manner is not proposed.

DISCLOSURE

Technical Problem

The present disclosure has been made in an effort to solve the problems described above and an objective is to provide an apparatus and method for transmitting an end-to-end video with ultra-low latency.

However, objectives of the present disclosure are not limited to those described above and other objectives not stated would be clearly understood from the following description by those skilled in the art.

Technical Solution

An apparatus for encoding a video with ultra-low latency according to an embodiment of the present disclosure includes: one or a plurality of video sources (110) configured to provide a video signal; an encoder (120) configured to encode the video signal provided from the video source (110); and a caster (130) configured to transmit video data encoded by the encoder (120) to the outside through a network communication network, wherein the encoder (120) is provided for each of the video source (110).

The encoder (120) may be linked with a user terminal (300), may receive feedback information about a reception state of video data from the user terminal (300), may encode a next video signal while adjusting encoding parameter values with reference to the feedback information, and may transmit the next video signal to the caster (130).

In this configuration, the encoder (120) may encode the video signal provided from the video source (110), and may sense a provided video signal and may encode and transmit the video signal to the caster (130) even though the video signal is a partial frame (sub-frame).

The caster (130) is connected with one or a plurality of encoders (120) and may transmit the video data encoded by the encoder (120) directly to the user terminal in a Peer-to-Peer (P2P) manner through the network communication network, transmit the video data to a platform server (200) in a relay stream manner, or transmit the video data while selecting any one of the two manners as a path.

Further, a method for encoding a video with ultra-low latency according to an embodiment of the present disclosure may include: receiving a video signal provided from one or a plurality of video sources (110) by means of an encoder (120); sensing and encoding the input video signal; transmitting the encoded video data to a caster (130); and transmitting the encoded video data directly to a user terminal (300) in a Peer-to-Peer (P2P) manner thorough a network communication network, transmitting the encoded video data to a platform server (200) in a relay stream manner, or selecting any one of the two manners as a path by means of the caster (130).

The encoding of the sensed video signal may further include sensing the video signal provided from the video source (110) and encoding the video signal without waiting the other frames even though the video signal is not a full frame, but a partial frame (sub-frame) of a sub-slice type.

Further, the method may further include imposing a charge in accordance with a subscription plan of a user for a provided video service by means of the caster (130) in linkage with the platform server (200).

Advantageous Effects

According to the configuration described above, the present disclosure has the following effects.

First, the apparatus and method for encoding a video with ultra-low latency according to the present disclosure has the advantage that it is possible to transmit/receive a video without disconnection by enabling an end-to-end video to be transmitted with ultra-low latency.

Second, the apparatus and method for encoding a video with ultra-low latency according to the present disclosure enables a video to be transmitted with ultra-low latency, so there is the advantage that the present disclosure can be applied to various fields of 4th industry such as autonomous driving, unmanned drone operation, driving of unmanned heavy equipment, robot control, a remote medical service, VR/AR, an intelligent CCTV, a smart city•factory, provision of traffic information, etc.

MODE FOR INVENTION

Figure 1:
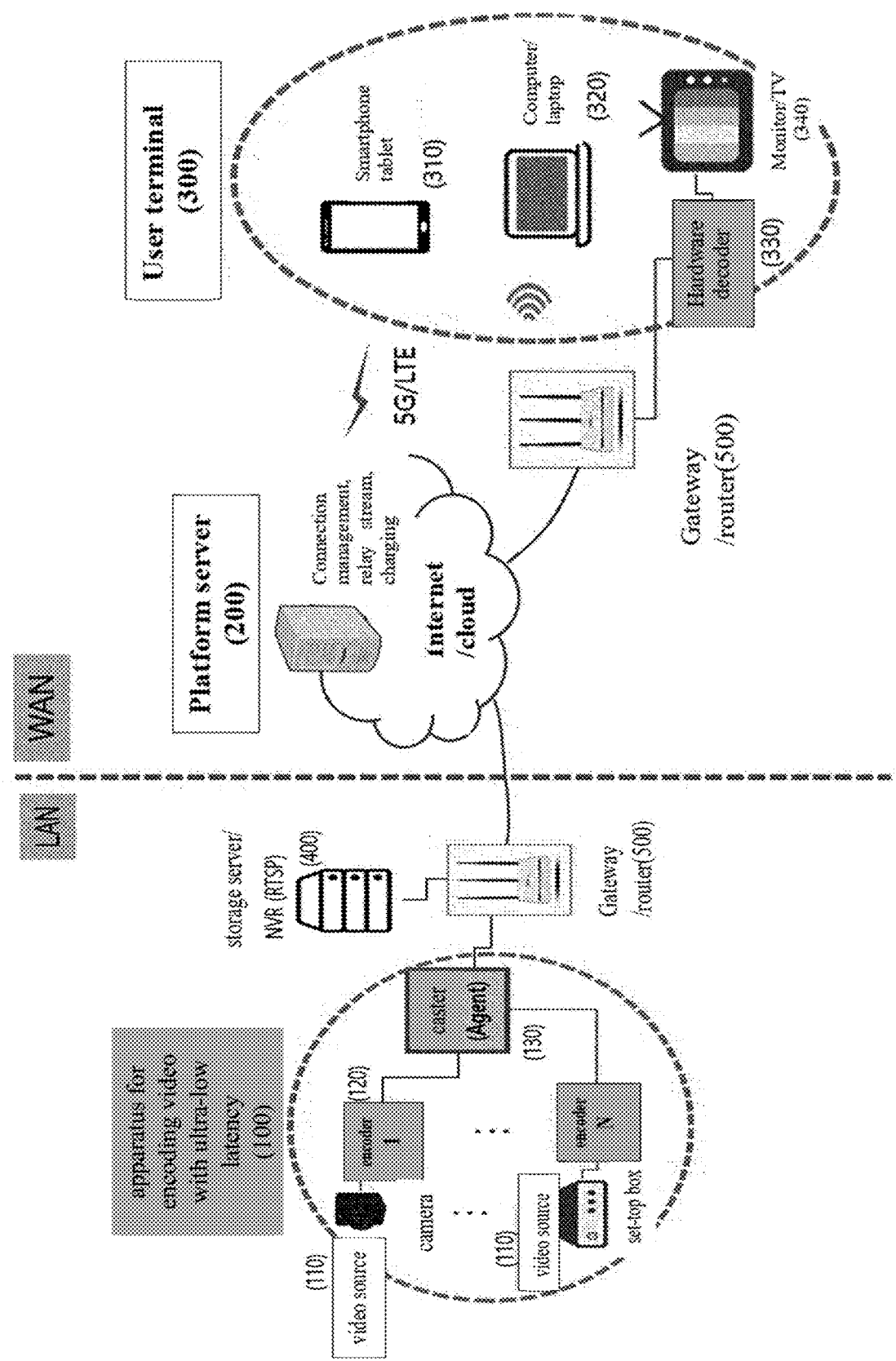
FIGS. 1 and 2 are configuration diagrams of a platform (system) to which an apparatus 100 for encoding a video with ultra-low latency according to an embodiment of the present disclosure is applied ant that is provided with an ultra-low latency video transmission service.

The configurations and effects of the present disclosure, and methods of achieving them will be clear by referring to the embodiments that will be describe below in detail with reference to the accompanying drawings. However, the present disclosure is not limited to the exemplary embodiments described hereafter and may be implemented in various ways, the exemplary embodiments are provided to complete the description of the present disclosure and let those skilled in the art completely know the scope of the present disclosure. The right range of the present disclosure is defined only by claims.

Throughout the present specification, unless explicitly described otherwise, "comprising" any components will be understood to imply the inclusion of other components rather than the exclusion of any other components.

Terms "~er", etc. used herein mean the units for processing at least one function or operation and may be implemented by hardware, software, or a combination of hardware and software.

Further, in accordance with various embodiments, one "unit" may be implemented as one physical-logical part, a plurality of "units" may be implemented as one physical-logical part, or one "unit" may be implemented as a plurality of physical-logical parts.

Like reference numerals indicate the same components throughout the specification.

Hereafter, an apparatus for transmitting a video with ultra-low latency according to an embodiment of the present disclosure is described in detail with reference to the accompanying drawings.

It should be understood that combinations of the blocks in processing flowcharts and combinations of processing flowcharts may be performed by computer program instructions.

The computer program instructions may be mounted on a processor of a common computer, a special computer, or programmable data processing equipment, so the instructions that are performed by the processor of a computer or other programmable data processing equipment create parts that perform the functions described in the flowchart block (s).

The computer program instructions may be stored in a computer-usable or computer-readable memory that can be oriented to a computer or other programmable data processing equipment to implement functions in specific ways, so the instructions stored in the computer-usable or computer-readable memory may also produce manufacturing items including instruction means performing the functions described in flowchart block(s).

The computer program instructions may also be mounted on a computer or other programmable data processing equipment, a series of operations are performed on the computer or other programmable data processing equipment and create processes that are executed in the computer and the instructions that perform the computer or other programmable data processing equipment may provide operations for executing the functions described in flowchart block(s).

Further, each block(s) may show a part of a module, a segment, or a code including one or more executable instructions for executing specific logical function(s). Further, it should be noted that the functions stated in blocks do not follow the order in some substitutive example embodiments. For example, two sequential blocks may be substantially simultaneously performed or may be performed in the reverse order in some cases, depending on corresponding functions.

Figure 2:
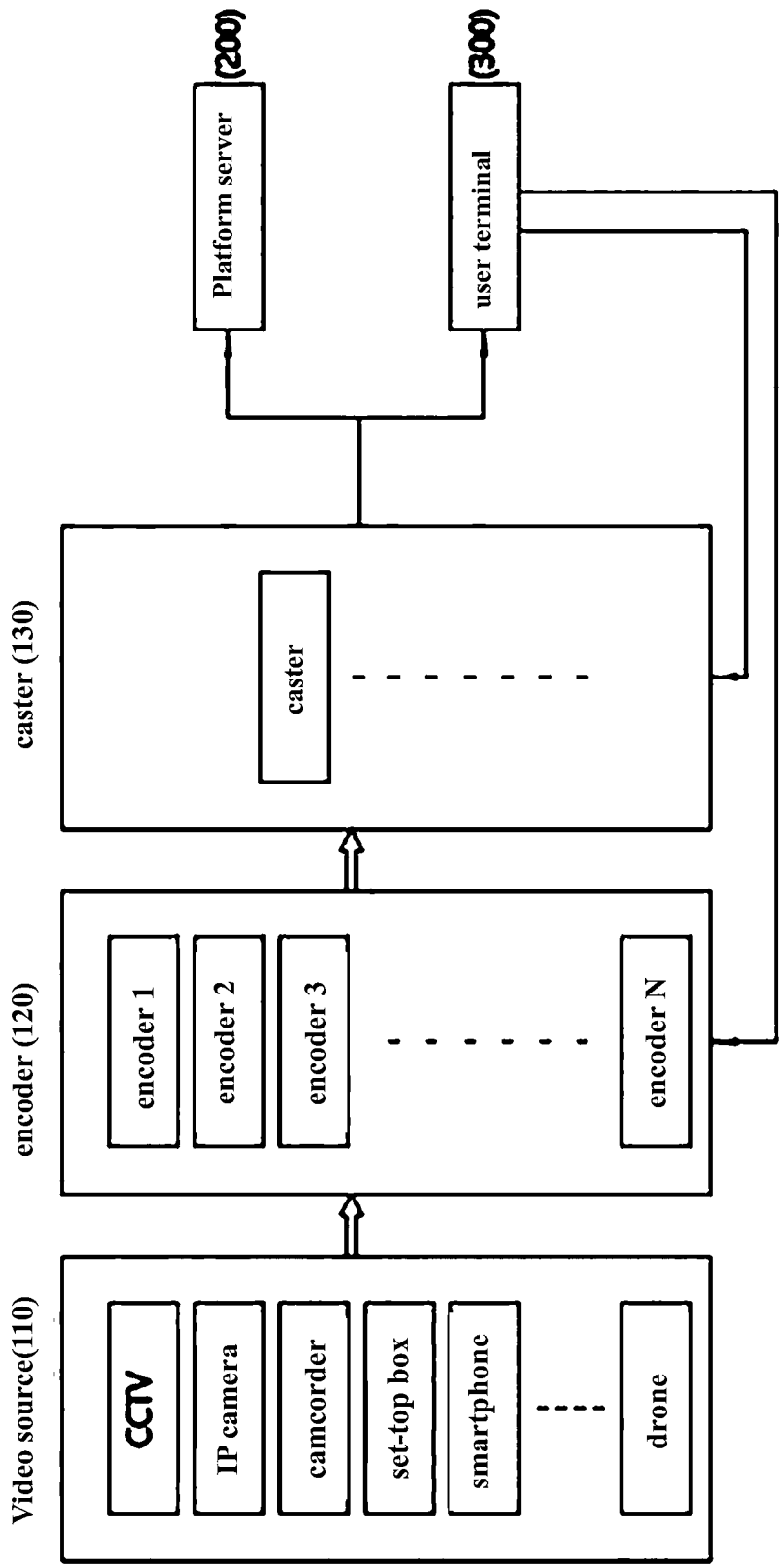
Figure 9:
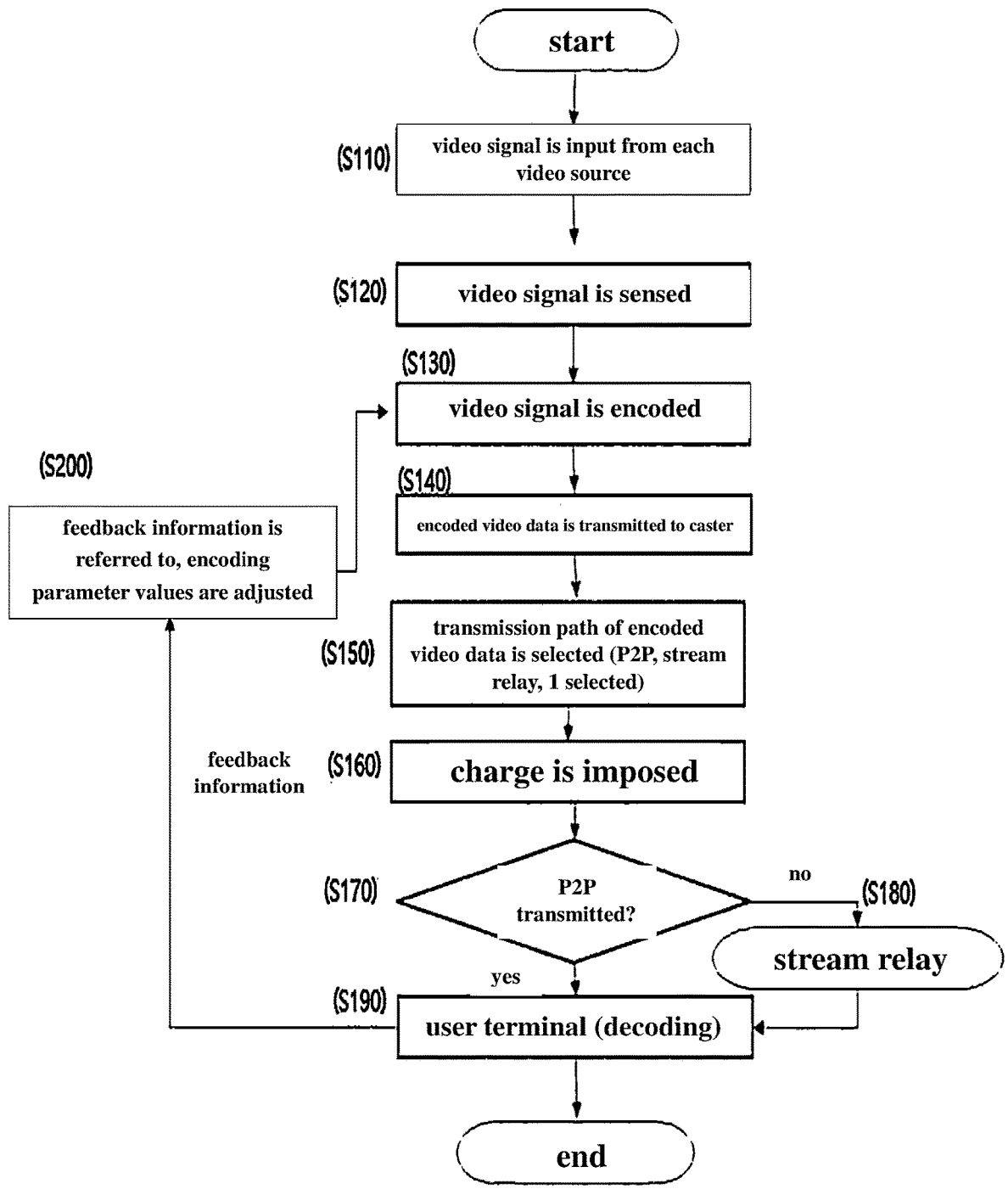
FIG. 9 is a flowchart showing a method for encoding a video with ultra-low latency according to an embodiment of the present disclosure.

FIGS. 1 and 2 are configuration diagrams of an entire platform (system) to which an apparatus for encoding a video with ultra-low latency according to an embodiment of the present disclosure is applied ant that is provided with an ultra-low latency video transmission service and FIG. 9 is a flowchart showing a method for encoding a video with ultra-low latency according to an embodiment of the present disclosure.

Further, FIGS. 3 to 6 are various embodiments (integrated examples) of an apparatus 100 for encoding a video with ultra-low latency according to an embodiment of the present disclosure.

Figure 7:
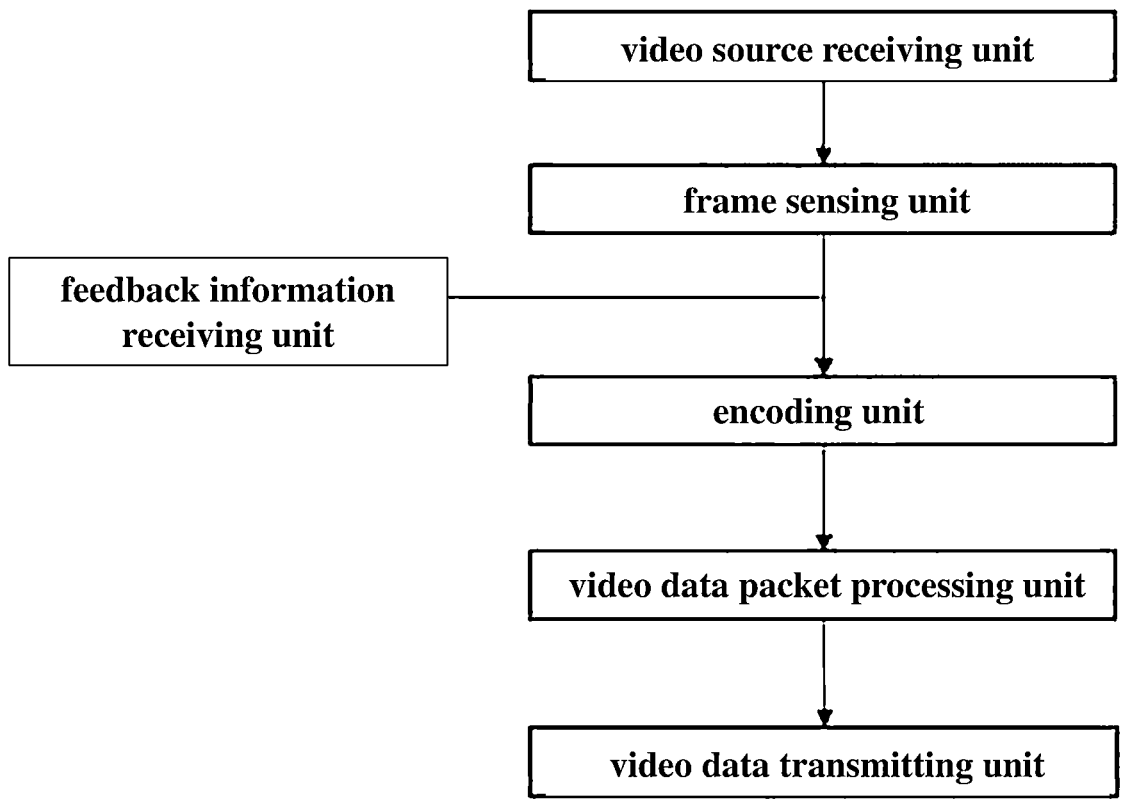
FIG. 7 is a configuration diagram of an encoder 120 of the apparatus for encoding a video with ultra-low latency according to an embodiment of the present disclosure.
Figure 8:
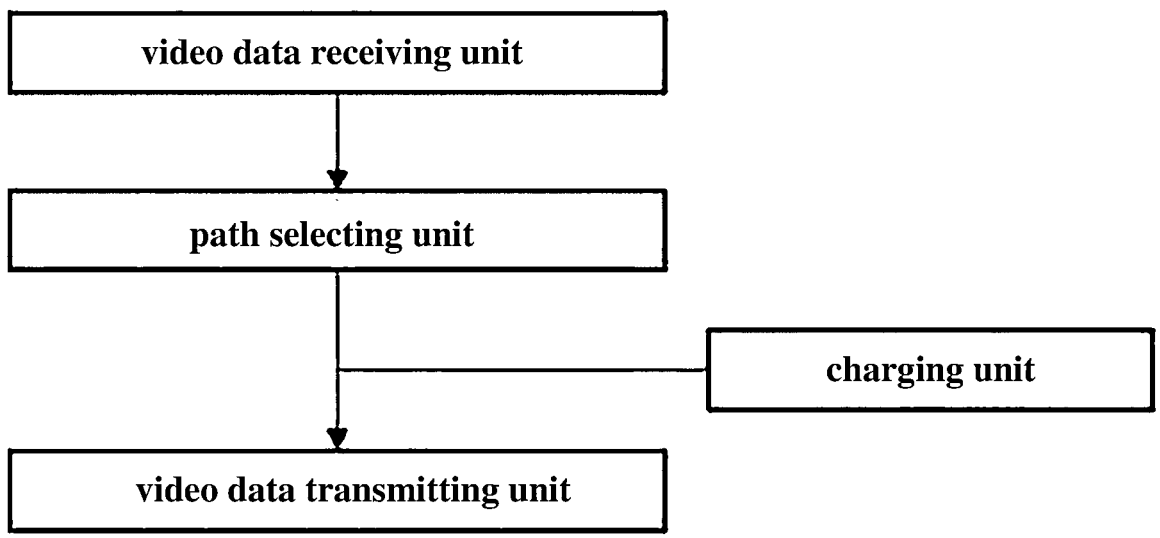
FIG. 8 is a configuration diagram of a caster 130 of the apparatus for encoding a video with ultra-low latency according to an embodiment of the present disclosure.

Further, FIGS. 7 and 8 respectively show the configurations of an encoder 120 and a caster 130 of the apparatus 100 for encoding a video with ultra-low latency according to an embodiment of the present disclosure.

First, referring to FIGS. 1 and 2, an apparatus 100 for encoding a video with ultra-low latency of the present disclosure includes a video source 110, an encoder 120, and a caster 130.

According to the apparatus 100 for encoding a video with ultra-low latency, the encoder 12 encodes and transmits a video signal provided from the video source 110 such as one or a plurality of intelligent CCTV, IP cameras, smartphones, drones, and PCs, and when there is a request for video data encoded by the encoder 120 from a user terminal 300, the caster 130 serves to transmit the video data direct in a Peer-to-Peer (P2P) manner through a network communication network, or transmit the video data to a platform server 200 in a stream relay manner, transmit the video data while selecting any one of the two manners as a path.

The video source 110 included in the apparatus 100 for encoding a video with ultra-low latency, which is a device that can obtain a video signal (video content) corresponding to photographing by photographing an object or a background in accordance with operation by a user or predefined setting, may be an intelligent CCTV, an IP camera, a camcorder, a smartphone, a set-top box, a drone, a PC, etc.

The encoder 120 included in the apparatus 100 for encoding a video with ultra-low latency may include one or a plurality of encoders to be provided for the video sources 110, respectively, and encodes a video signal (video content), which is input from each of the video sources 110, at a high speed and transmits the video signal to the caster 130.

In this configuration, the encoder 120 senses the video signal provided through the video source 110, and even though not a full frame, but a partial frame (sub-frame) of sub-slice type is input, the encoder 120 encodes and transmits a video signal to the caster 130 without waiting the other frames. Accordingly, the frame standby time decreases, whereby ultra-low latency transmission becomes possible.

Further, the encoder 120 can be liked with the user terminal 300. That is, the encoder 120 receives feedback information about the reception state of video data in real time from the user terminal 300 and encodes the next video signal while adjusting encoding parameter values with reference to the feedback information, and transmits the next video signal to the caster 130.

As described, since the encoder 120 and the user terminal 300 that functions as a decoder transmit and receive feedback information about the reception state of video data in real time in linkage with each other and then apply the feedback information to the next video signal, a video can be transmitted in real time and the quality of video data can be secured, so there is no need for a specific procedure for securing QoS of a video and ultra-low latency transmission becomes possible.

In this case, the feedback information may include at least any one of network communication network state information, an available bandwidth of data, a data loss rate, a video quality, and whether there is disconnection, and the encoding parameter values may include at least any one of a compression quantum value, a bitrate, the size of a subframe to be encoded, a frame per second (fps), multicast, and the value of a group-of-pictures (GoP).

Figure 4:
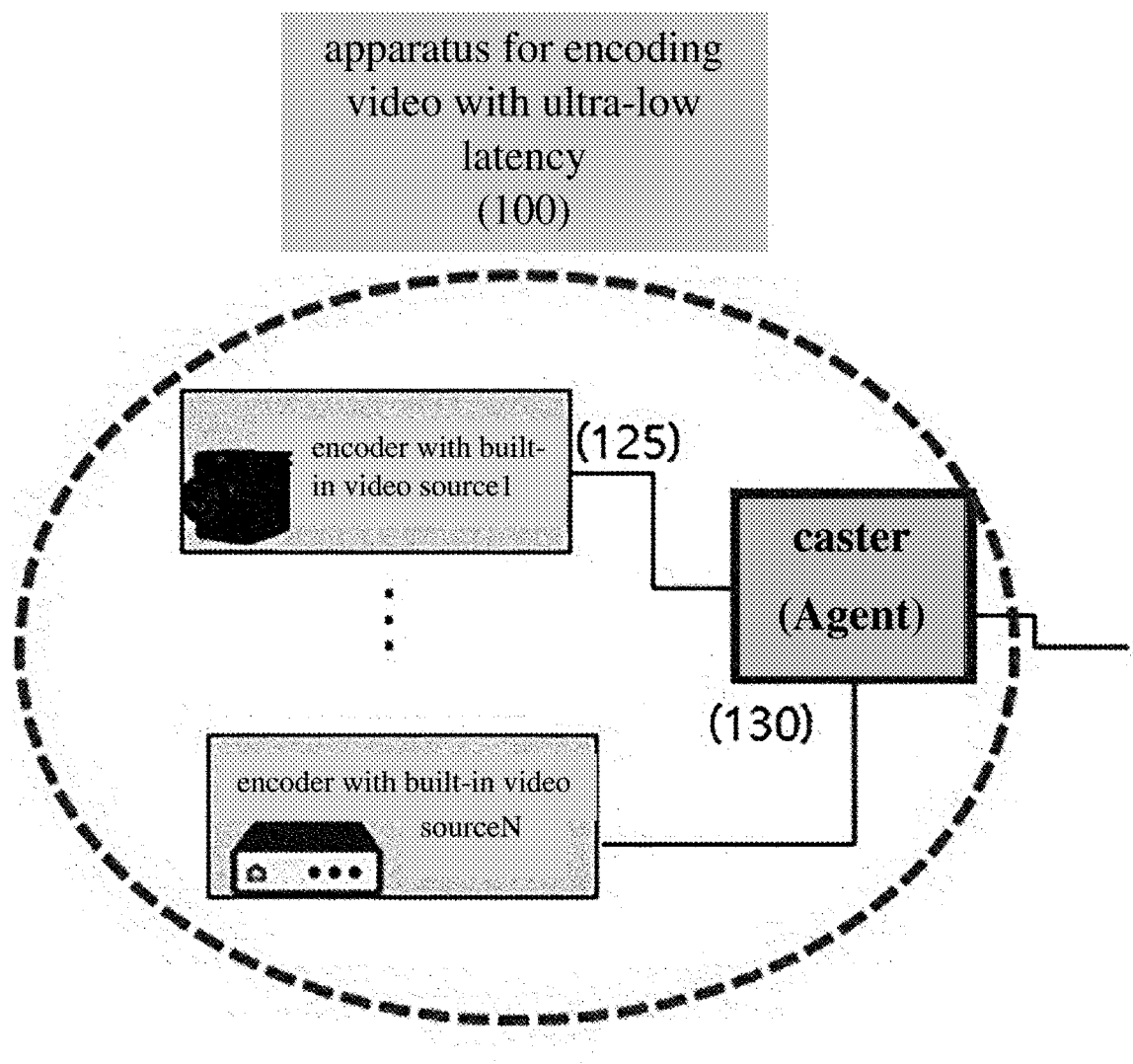

Further, for ultra-low latency transmission of a video signal, each video source 110 may be provided with an encoder 120, whereby each encoder can individually performing an encoding function. Of course, the encoder 120, as shown in FIG. 4, may be disposed in the video source 110 in an integral type.

The encoder 120 according to an embodiment of the present disclosure may include: a video source receiving unit that receives a video signal input through the video source 110; a frame sensing unit that senses the input video signal (including sensing whether the video signal is an entire or partial frame); a feedback information receiving unit that receives feedback information about the reception state of video data from the user terminal 300; an encoding unit that encodes a video signal received from the frame sensing unit; a video data packet processing unit that converts video data encoded by the encoding unit into a plurality of data packets; and a video data transmitting unit that transmits the video data processed by the video data packet processing unit to the caster 130.

Meanwhile, when there is a request from a user, the caster 130 included in the apparatus 100 for encoding a video with ultra-low latency can transmit a video signal directly to the user terminal 300 in a P2P manner thorough a network communication network, transmit a video signal to the platform server 200 in a relay stream manner, or transmit a video signal while selecting any one of the two manners as a path.

In this case, the network communication network may be not only an IP-based wired communication network such as the internet, but various wireless communication networks such as mobile communication network including a Long term evolution (LTE) network and a WCDMA network, and a Wi-Fi network, and a combination thereof. Though not shown in the figures, the network communication network may include an access network, a backbone network, and an internet network.

The caster 130 monitors the state of the encoder 120 connected thereto, sets network setting values (an IP address, a port number, etc.), and performs charging a user for a video service in linkage with the platform server 200.

Further, the caster 130 can copy and transmit video data to many user terminals 300 so that many users can see video data of the same encoder 120.

Figure 5:
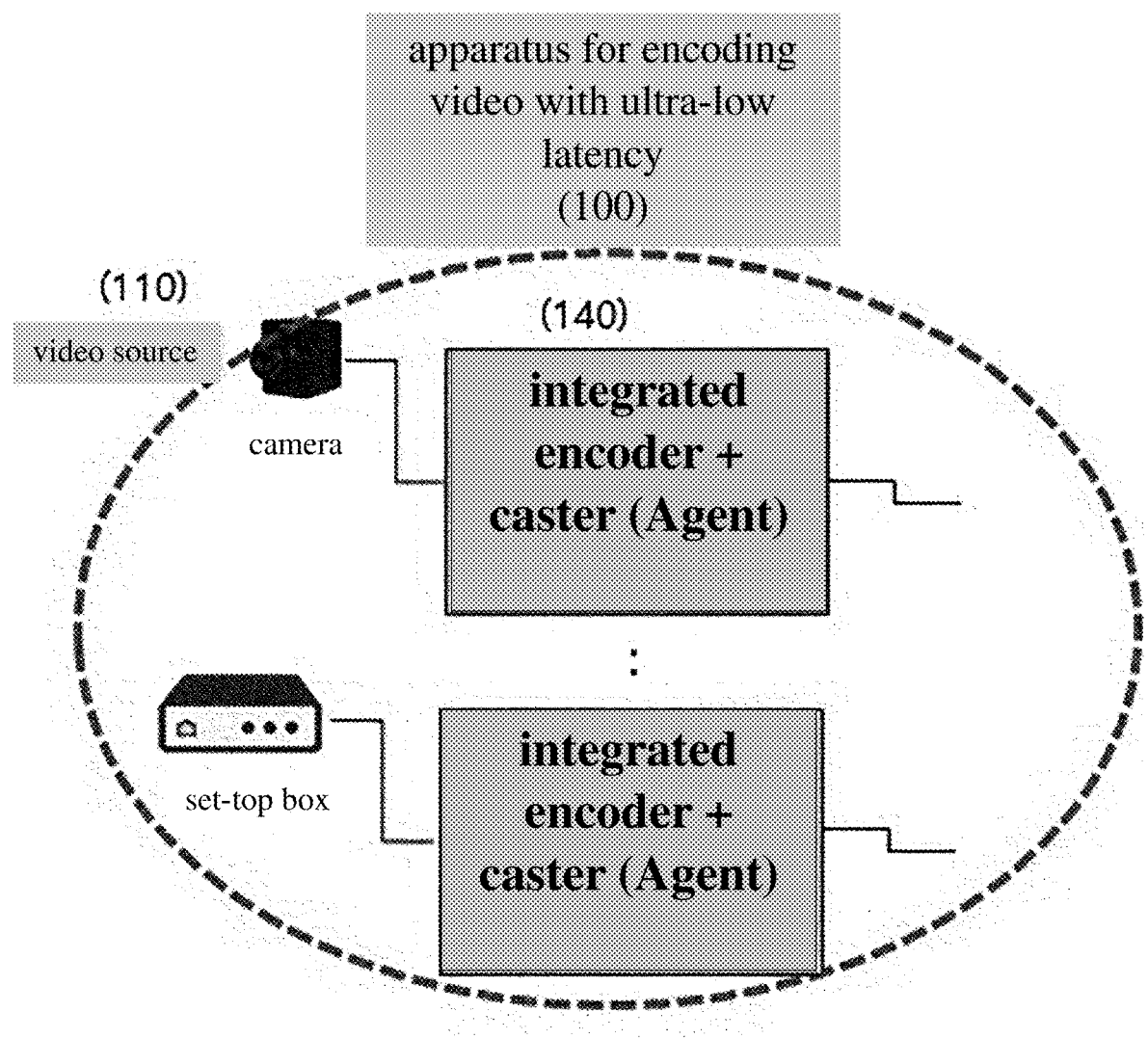

Meanwhile, the caster 130 may be installed separately from the encoder 120 (FIGS. 3 and 4) and may be integrated with the encoder 120 (FIG. 5).

One or a plurality of encoders 120 may be connected to and registered on the caster 130 and the caster 130 may function as a gateway/router 500.

The caster 120 according to an embodiment of the present disclosure may include: a video data receiving unit that receives video data from the video data transmitting unit of the encoder 120; a path selecting unit that transmits the received video data directly to the user terminal 300 in a P2P manner through a network communication network, transmits the received video data to the platform server 200 in a relay stream manner, or selects any one of the two manners as a path; a video data transmitting unit that transmits the video data through a path determined by the path selecting unit; and a charging unit that charges a user for use of a video service in linkage with the platform server 200.

Figure 3:
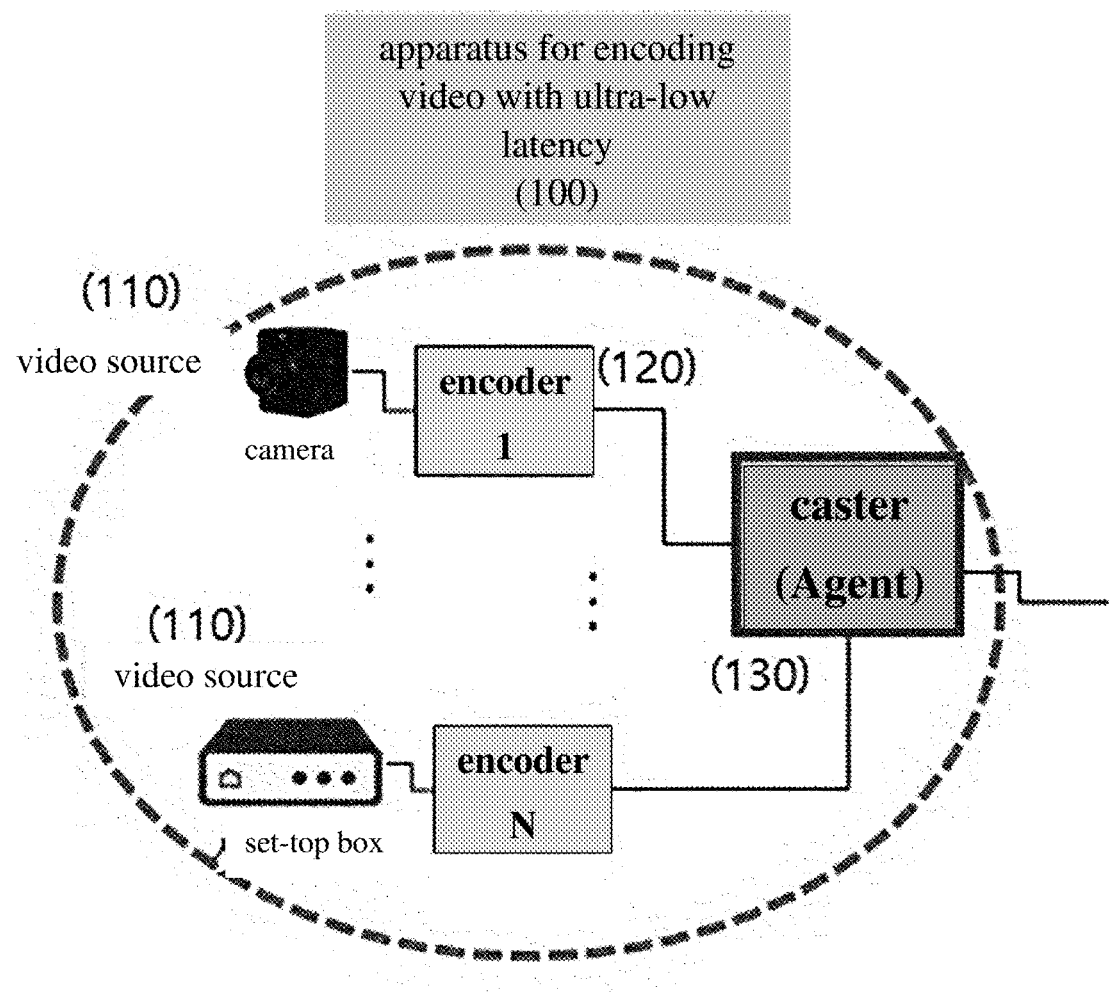
FIGS. 3 to 6 are various embodiments (integrated examples) of the apparatus 100 for encoding a video with ultra-low latency according to an embodiment of the present disclosure.
Figure 6:
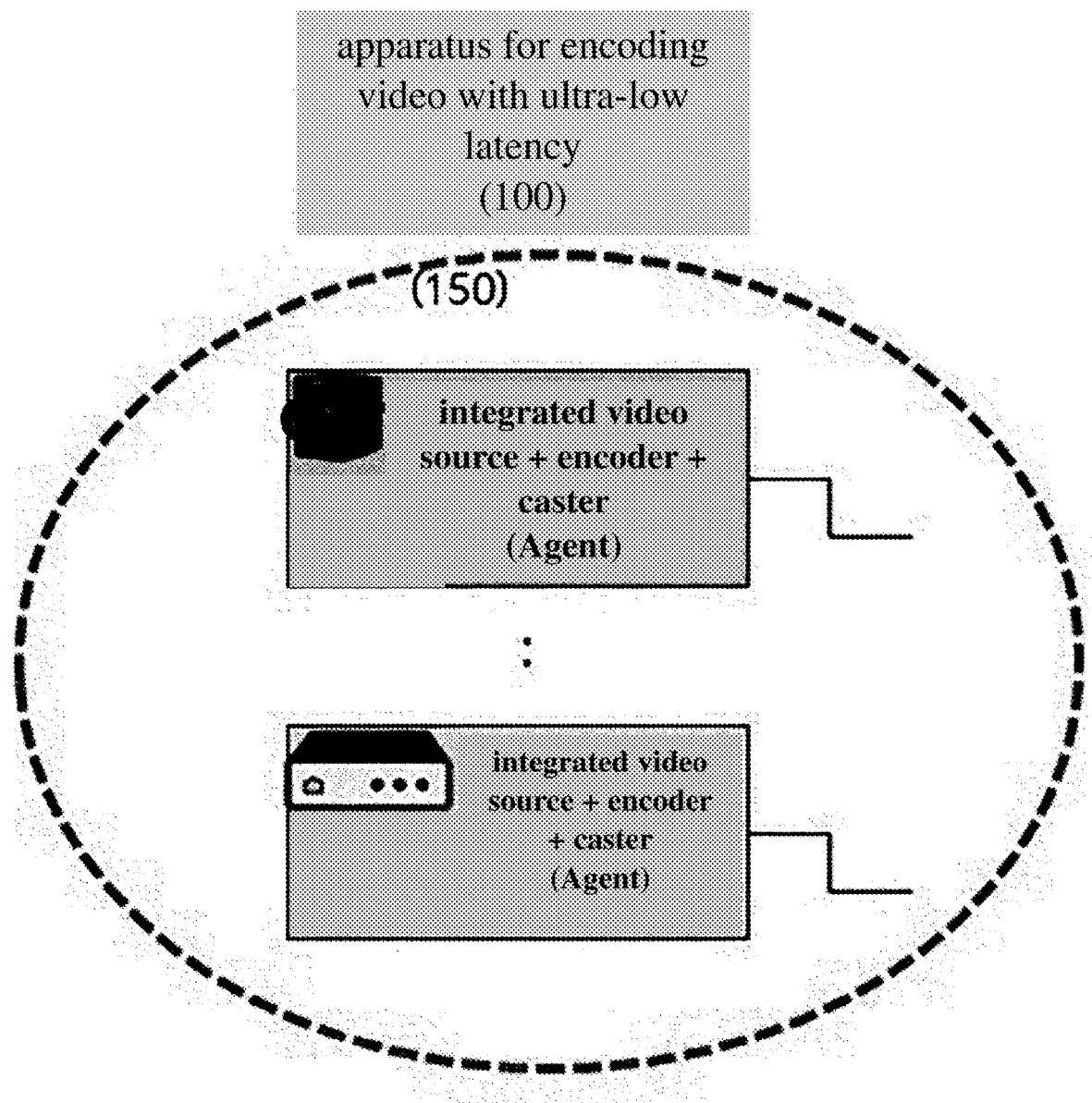

Meanwhile, the apparatus 100 for encoding a video with ultra-low latency of the present disclosure may include three parts of the video source 110, the encoder 120, and the caster 130, as shown in FIG. 3, may include two parts including the caster 130 by disposing the encoder 120 in the video source 110, as shown in FIG. 4, may include two parts including the video source 110 by integrating the encoder 120 and the caster 130, as shown in FIG. 5, and may include one part by integrating all of the video source 110, the encoder 120, and the caster 130, as shown in FIG. 6.

It is possible to reduce the video signal standby time by integrating the video source 110, the encoder 120, and the caster 130, depending on necessity and situations, so ultra-low latency transmission becomes more possible.

Next, referring to FIG. 9, a method for encoding a video with ultra-low latency according to an embodiment of the present disclosure includes: receiving a video signal provided and input from one or a plurality of video sources 110 by means of an encoder 120 (S110); sensing the input video signal (including whether the video signal is an entire or partial frame) (S120); encoding the sensed video signal (S130); transmitting the encoded video data to a caster 130 (S140); and transmitting the encoded video data directly to a user terminal 300 in a P2P manner thorough a network communication network, transmitting the encoded video data to a platform server 200 in a stream relay manner, or selecting any one of the two manners as a path by means of the caster 130 (S150).

The encoding of the sensed video signal (S130) may further include encoding a video signal provided from the video source 110 without waiting the other frames even though the video signal is not a full frame, but a partial frame (sub-frame) of sub-slice type.

Further, the encoding of the sensed video signal (S130) may further include encoding the next video signal while adjusting encoding parameter values with reference to feedback information about the reception state of video data received in real time from a linked user terminal 300 (S200).

In this case, the feedback information may include at least any one of network communication network state information, an available bandwidth of data, a data loss rate, a video quality, and whether there is disconnection, and the encoding parameter values may include at least any one of a compression quantum value, a bitrate, the size of a subframe to be encoded, a frame per second (fps), multicast, and the value of a group-of-pictures (GoP).

Further, the method for encoding a video with ultra-low latency of the present disclosure may further include imposing a charge in accordance with the subscription plan for a video service provided to the user terminal 300 by means of the caster 130 linked with the platform server 200 (S160).

As described above, the apparatus and method for encoding a video with ultra-low latency of the present disclosure enables an end-to-end video to be transmitted with ultra-low latency, so a video can be transmitted/received without disconnection, whereby it is possible to provide an ultra-low latency service anytime anywhere as long as the internet is connected.

The embodiments of the present disclosure described above may be written as programs that can be executed in a computer and may be implemented in a common digital computer that executes the programs using a computer-readable recording medium.

The computer-readable recording medium includes storage media such as a magnetic storage medium (e.g., a ROM, a floppy disk, hard disk, etc.), an optical reading medium (e.g., a CD-ROM, a DVD, etc.), and a carrier wave (e.g., transmission through the internet).

Preferred embodiments were described above to explain the present disclosure. It would be understood by those skilled in the art that the present disclosure may be freely modified without departing from the scope of the present disclosure. Therefore, the disclosed embodiments should be considered in terms of explaining, not limiting. The scope of the present disclosure is not shown in the above description, but claims, and all differences within an equivalent range should be construed as being included in the present disc.

This work was supported by the Industrial Technology Innovation Programs—'Mechanical equipment industrial technology development project' (20018414, Development of Remote Control System and Technology for Earth-moving Construction Machinery used in Smart Construction); 'Electronic component industry technology development project' (20023688, Development and Demonstration of Quality Management System for the Manufacturing Process of Electronic Components Based on Real-Time High-Resolution Video Transmission Technology); and 'Material and parts development project' (20011514, Development of SoC (system-on-chip) and its applied-module for 5G ultra low-latency UHD video transmission with real-time cryptography), all of which are funded By the Ministry of Trade, Industry & Energy (MOTIE, Korea).

The invention claimed is:

1. An apparatus for encoding a video, the apparatus comprising:
   one or more video sources configured to provide a video signal;
   an encoder configured to encode the video signal and provided for each of the one or more video sources; and
   a caster configured to receive the encoded video signal and configured to transmit video data encoded by the encoder through a network communication network,
   wherein the encoder is linked with a user terminal, receives feedback information about a reception state of the video data from the user terminal, encodes a next video signal while adjusting encoding parameter values with reference to the feedback information, and transmits the next video signal to the caster; and
   the caster selects whether to transmit the video data encoded by the encoder directly to the user terminal in a peer-to-peer (P2P) manner through the network communication network, or to transmit the video data encoded by the encoder to a platform server in a relay stream manner, and transmits the video data in the selected manner as a path,
   wherein the encoder includes: a video source receiving unit configured to receive a video signal input through the one or more video sources, the input video signal including an entire or partial frame; a frame sensing unit configured to sense the input video signal; a feedback information receiving unit configured to receive the feedback information about the reception state of the video data from the user terminal; an encoding unit configured to encode the video signal received from the frame sensing unit; a packet processing unit configured to convert the video data encoded by the encoding unit into a plurality of data packets; and a video data transmitting unit configured to transmit the video data processed by the packet processing unit to the caster.

2. The apparatus of claim 1, wherein even though the video signal provided through the one or more video sources is the partial frame, the encoder encodes and transmits the video signal to the caster without waiting other frames.

3. The apparatus of claim 1, wherein the feedback information includes at least one of network communication network state information, an available bandwidth of data, a data loss rate, a video quality, whether there is disconnection, or any combination thereof, and
   wherein the encoding parameter values includes at least one of a compression quantum value, a bitrate, a size of a sub-frame to be encoded, a frame per second (fps), multicast, a value of a group-of-pictures (GoP), or any combination thereof.

4. The apparatus of claim 1,
   wherein the user terminal includes a plurality of user terminals, and
   wherein the caster copies and transmits the video data encoded by the encoder to the plurality of user terminals.

5. The apparatus of claim 1, wherein the caster imposes a charge in accordance with a subscription plan of a user for a video service in linkage with the platform server.

6. The apparatus of claim 1, wherein the encoder is integrated in the video source.

7. The apparatus of claim 1, wherein the encoder and the caster are integrated with each other.

8. The apparatus of claim 1, wherein the video source, the encoder, and the caster are integrated with each other.

9. The apparatus of claim 1, wherein the caster includes: a video data receiving unit configured to receive the video data from the video data transmitting unit of the encoder; a path selecting unit configured to select whether to transmit the received video data directly to the user terminal in the P2P manner through the network communication network, or to transmit the received video data to the platform server in the relay stream manner; a video data transmitting unit configured to transmit the video data through the manner selected by the path selecting unit; and a charging unit configured to charge a user for use of a video service in linkage with the platform server.

10. A method for encoding a video, comprising:
    receiving a video signal input from one or more of a plurality of video sources, the input video signal including an entire or partial frame;
    sensing the input video signal;
    encoding the sensed video signal;
    transmitting the encoded video signal to a caster; and transmitting encoded video data directly to a user terminal in a peer-to-peer (P2P) manner thorough a network communication network, or transmitting the encoded video data to a platform server in a stream relay manner after selecting one of the P2P and stream relay manners as a path, and imposing a charge in accordance with a subscription plan of a user for use of a video service provided to the user terminal by means of the caster in linkage with the platform server, wherein the encoding of the sensed video signal further includes encoding a next video signal while adjusting encoding parameter values with reference to feedback information about a reception state of video data received in real time from a linked user terminal.

11. The method of claim 10, wherein the encoding of the sensed video signal further includes encoding the video signal without waiting other frames even though the video signal provided from the video source is the partial frame.

12. The method of claim 10, wherein the feedback information includes at least one of network communication network state information, an available bandwidth of data, a data loss rate, a video quality, whether there is disconnection, or any combination thereof, and wherein the encoding parameter values includes at least one of a compression quantum value, a bitrate, a size of a sub-frame to be encoded, a frame per second (fps), multicast, a value of a group-of-pictures (GoP), or any combination thereof.

* * * * *